Aug. 25, 1964  L. G. GHEEN  3,145,736
AUTOMATIC IRRIGATION VALVE WITH DAMPING DEVICE
Filed Sept. 24, 1962  4 Sheets-Sheet 1

LYNDLE G. GHEEN,
INVENTOR

BY
BUCKHORN, CHEATHAM & BLORE
ATTORNEYS

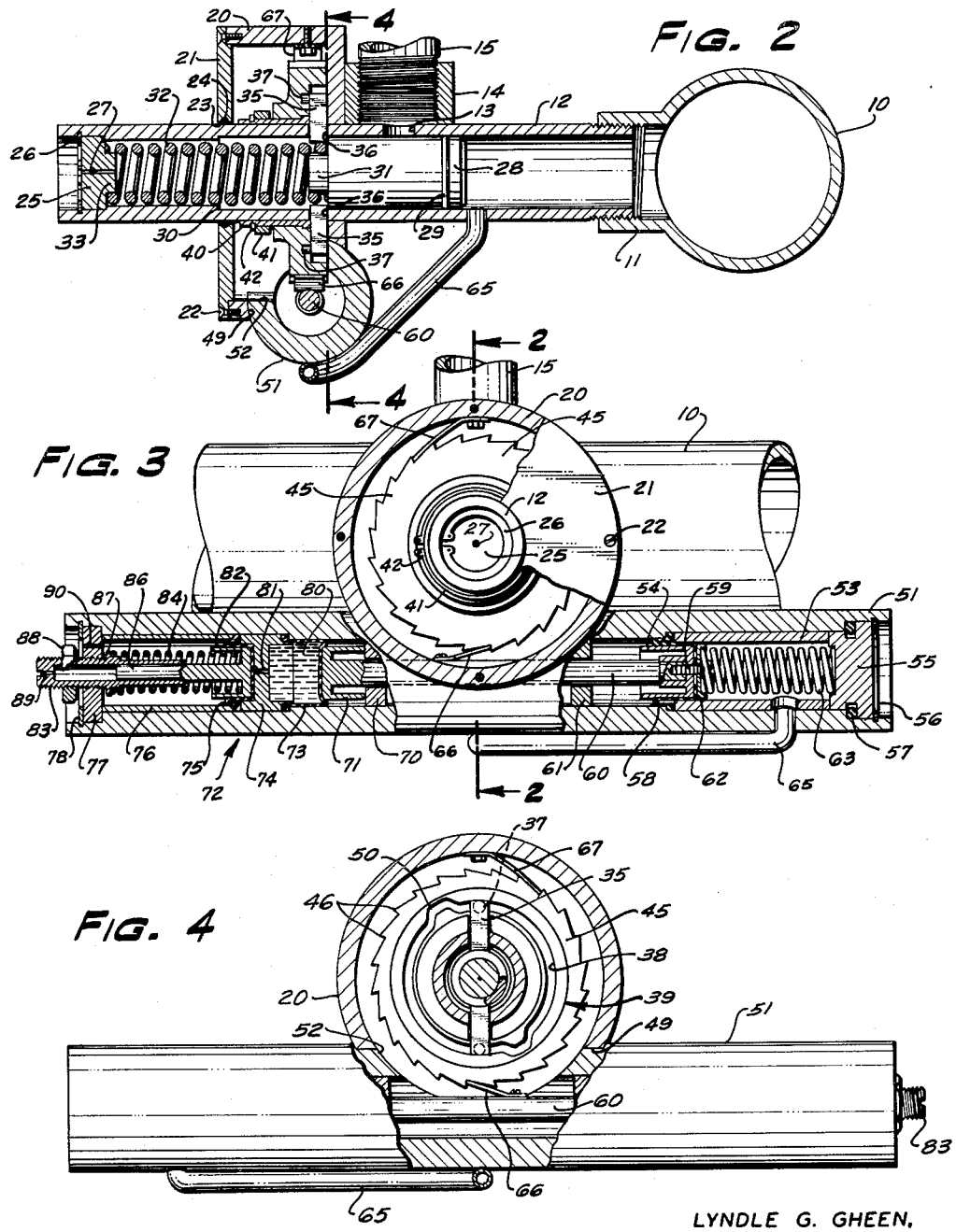

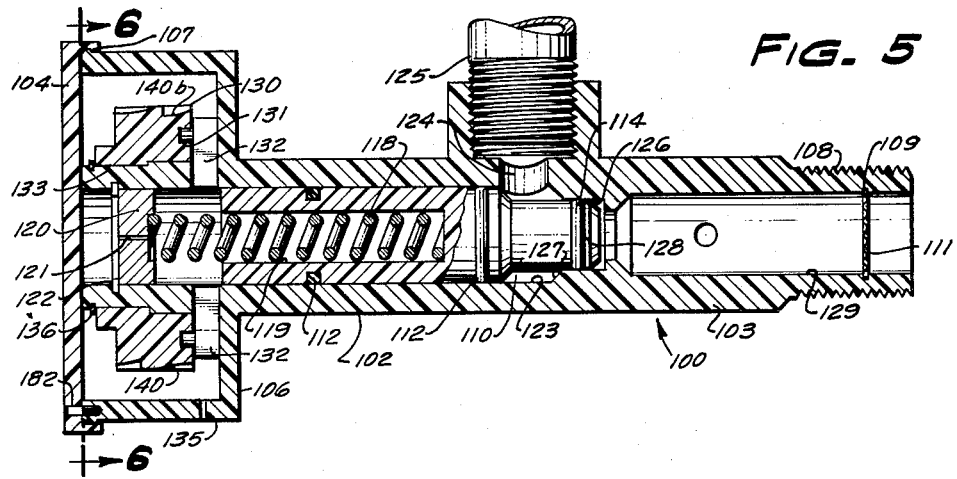

Aug. 25, 1964     L. G. GHEEN     3,145,736
AUTOMATIC IRRIGATION VALVE WITH DAMPING DEVICE
Filed Sept. 24, 1962     4 Sheets-Sheet 4
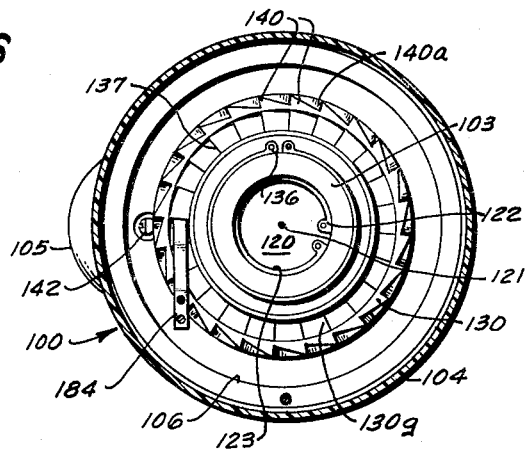
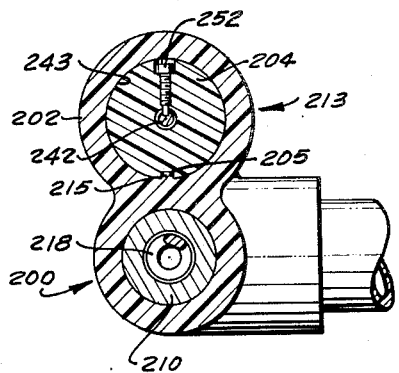
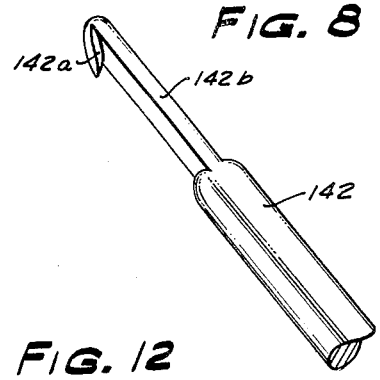
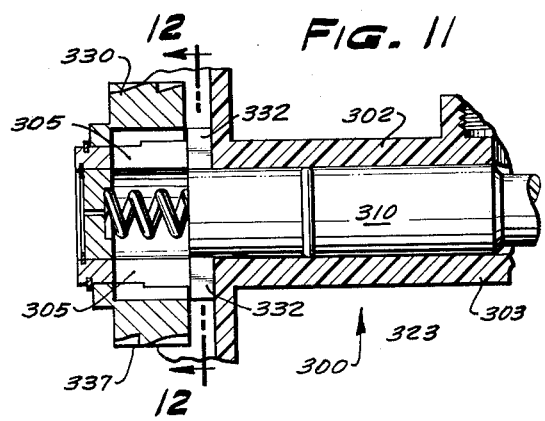
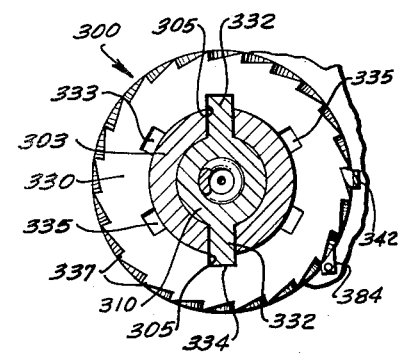
INVENTOR.
LYNDLE G. GHEEN.
BY
BUCKHORN, CHEATHAM & BLORE
ATTORNEYS

United States Patent Office 3,145,736
Patented Aug. 25, 1964

3,145,736
AUTOMATIC IRRIGATION VALVE WITH
DAMPING DEVICE
Lyndle G. Gheen, Eugene, Oreg., assignor to R. H. Pierce
Manufacturing Company, Eugene, Oreg., a corporation
of Oregon
Filed Sept. 24, 1962, Ser. No. 225,745
24 Claims. (Cl. 137—624.13)

My present invention comprises improvements in liquid distribution systems, for example the remote control irrigation system disclosed and claimed in the patent to Carver, Jr. No. 2,793,908, issued May 28, 1957. In such a system a plurality of valved outlets from a main conduit adapted to be connected to an interruptible souce of liquid under pressure include means whereby repetitious stopping and starting of the source of liquid under pressure will cause successive operation of selected valves to control the flow of liquid through selected outlets in a definite, repeating cycle.

The present invention is particularly suitable for remote control irrigation systems wherein a main conduit is provided with a plurality of branch outlets at spaced points, each branch outlet having a repeating cycle control means associated therewith to control the flow to a sprinkler head at controllable intervals. Such a system is illustrated and described in greater detail in the above-identified patent, in which each branch outlet includes a sprinkler head covering a portion of a field to be sprinkler irrigated. By means of the present invention a pump capable of supplying water to a few of a multiplicity of sprinkler heads may be remotely controlled, as by interrupting the flow of current to a motor driving the pump by means of a remote switch or the like. It will be appreciated that a system of the foregoing type may be controlled manually or automatically, either by a workman manually throwing a switch at intervals, or by means of an electric programmer automatically making and breaking the motor power circuit.

The present invention is also suitable for controlling the flow of liquid in repetitious cycles through branch outlets of a main conduit in other not immediately apparent applications.

A principal object of the present invention is to provide a valve means for controlling branch outlet flow at intervals, in which the valve is protected from the effect of water hammer in the main condiut, and in which movements of the valve parts are damped so that the opening and closing of the branch outlets will not create water hammer in the system.

A further object of the present invention is to provide a valve of the foregoing character which is self-lubricated, by means of leakage to moving parts thereof of the fluid being distributed.

A further object of the present invention is to provide means of the foregoing character in which the cyclical operation of the valve may be quickly altered by substitution of one moving part for another similar but different part.

A further object of the present invention is to provide a valve of the foregoing character which is operated upon the release of fluid pressure in the fluid distribution system, so that the movement of certain parts occurs when the pressure in the system tending to immobilize such parts is diminished.

The foregoing and other objects and advantages of the present invention may be readily determined from inspection of the following specification taken in connection with the accompanying drawings, where like numerals refer to like parts throughout.

In the drawings,

FIG. 2 is a vertical section taken substantially along line 2—2 of FIG. 3;

FIG. 3 is an end view of the present invention taken from the left end of FIG. 2 and with parts broken away at various planes;

FIG. 4 is a vertical section taken substantially along line 4—4 of FIG. 2;

FIG. 5 is a vertical section of a valve mechanism forming an alternate embodiment of the invention;

FIG. 6 is a vertical section taken along line 6—6 of FIG. 5;

FIG. 7 is a partially sectional, top plan view of the valve mechanism of FIG. 5;

FIG. 8 is an enlarged, fragmentary perspective view of a pawl of the valve mechanism of FIG. 5;

FIG. 9 is a partially sectional, top plan view of a valve mechanism forming another embodiment of the invention;

FIG. 10 is a vertical section taken along line 10—10 of FIG. 9;

FIG. 11 is a fragmentary vertical section of a valve mechanism forming another embodiment of the invention; and FIG. 12 is a vertical section taken along line 12—12 of FIG. 11.

Figure 1:
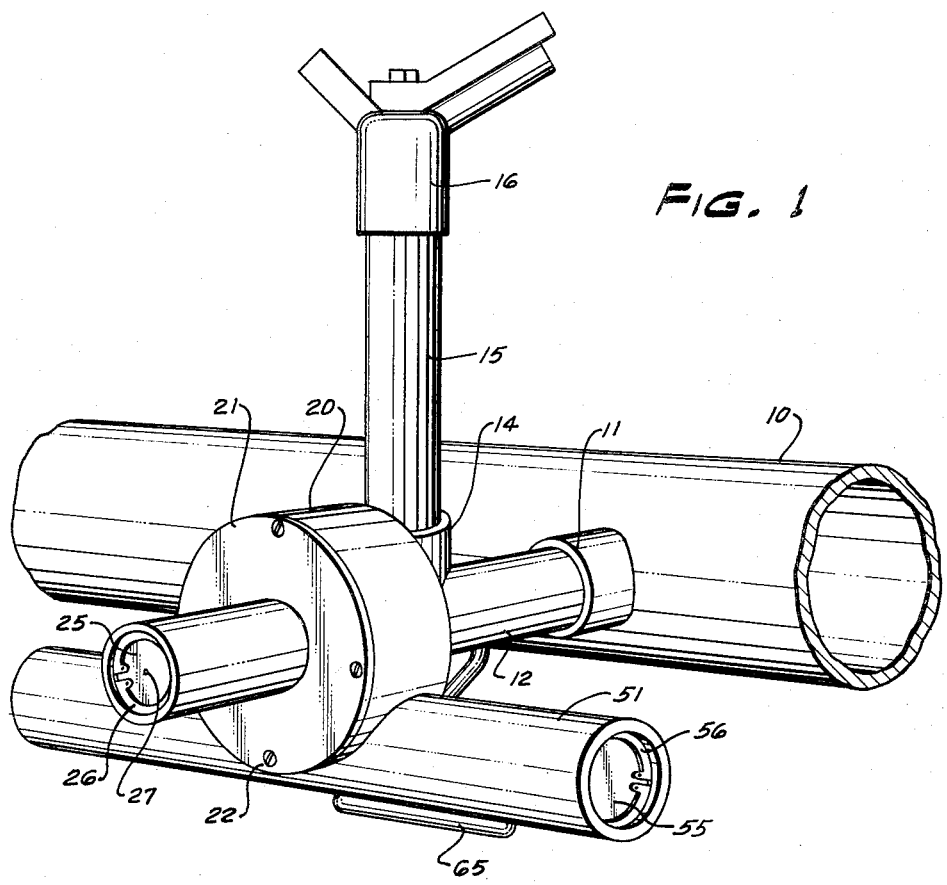
FIG. 1 is a view in perspective of a valve mechanism of the present invention attached to a main condiut of a field irrigation system and controlling the flow of irrigation water through a sprinkler head.

The invention provides an improved liquid distribution system which may include a valve having a closure member urged by water pressure toward an open position together with water pressure responsive actuating means operable upon a drop in water pressure to move blocking means out of the path of the closure member so that the member may be opened by the next rise in water pressure. Delay means may be provided in the actuating means so that the water pressure on the closure member is relieved before the actuating means moves the blocking means to minimize force required to move the blocking means.

In the drawings, the numeral 10 refers to what is herein designated as a main conduit. It is to be appreciated that this conduit could be a branch conduit of a larger main conduit for supplying water to a large number of sprinklers. The conduit 10 is provided at convenient intervals with outlet nipples 11 into which are screwed branch conduits, herein designated first conduits 12, such conduits 12 extending horizontally outward from the conduit 10. The first conduit 12 is provided with an outlet opening 13 intermediate its length, surrounding which is a nipple 14 into which is threaded a riser or second conduit 15. In a field irrigation system the second conduits would each be risers, each supporting a suitable sprinkler head 16. In some other types of liquid distribution systems the second conduits might extend horizontally to desired equipment of whatever type is to be supplied with fluid therethrough. In other words, it is not essential that the second conduits extend upward at right angles to the first conduits, although for some purposes such as field irigation sprinkler systems this may be highly desirable or even necessary.

On the downstream side of the nipple 14 a housing is positioned in surrounding relation to the first conduit 12, the housing comprising a cup-shaped part 20 through which the conduit extends in a concentric manner, there being an opening in the bottom of the cup-shaped member 20 and the housing and conduit being preferably welded together about the opening. The housing is completed by a disc cap 21 which is held in position by suitable screws 22, which cap is provided with a concentric opening 23 through which the conduit extends. An O-ring gasket 24 is preferably provided to seal the opening 23. The outer end of the conduit 12 is provided with a countersunk seat in which is seated a removable plug 25 retained by a snap ring 26 and through which there extends a small vent opening 27. A first piston 28 is mounted in the conduit 12, the piston being provided with a piston ring 29 which prevents the passage of fluid under pressure past the upstream end portion of the piston. When the pressure in the conduit system decreases below a predetermined point, the first piston 28 is moved to a second conduit blocking position, as illustrated in FIG. 2, with the piston ring 29 on the upstream side of the opening 13. When the pressure in the main conduit 10 increases above a predetermined point the first piston 28 may be moved to the left in FIG. 2, such movement being limited by the downstream end of the piston striking a shoulder 30 in the first conduit. The downstream end of the first piston is provided with a reduced diameter extension 31 which retains one end of a compression spring 32 coiled within the outer end of the first conduit, the other end of the spring being retained by a reduced extension 33 of the plug 25. The pressure in the main conduit 10 has to increase beyond a predetermined point in order to move the first piston to its second conduit clearing position beyond the opening 13 against the compression of spring 32. When the pressure in conduit 10 drops below a predetermined point, the spring 32 returns the first piston to its second conduit blocking position as illustrated.

The first piston 28 is normally held in its blocking position by dogging means including a pair of rectangular, elongated dogs 35 which extend radially outward in diametrically opposed relation through a pair of guide openings 36 in the wall of the second conduit 12 immediately downstream from the inner surface of the cup-shaped member 20. The outer end of each dog 35 is provided with a lateral cam follower projection 37 which engages a cam track 38 (FIG. 4) in a cam member 39 rotatably and concentrically mounted on the first conduit 12 within the housing, there preferably being provided a bushing 40 upon which the cam member is mounted for reducing friction. The cam member is retained against axial movement by the bottom wall of the cup-shaped member 20 and by a bearing ring 41 surrounding the bushing 40 and retained against axial movement by a snap ring 42. The outer edge of the cam member is provided with a concentric ratchet 45, the ratchet preferably being an integral portion of the cam member and comprising a plurality of ratchet teeth 46 on its periphery. The major portion of the cam track 38 is concentric, but it is provided with outwardly projecting portions 50 in diametrically opposed pairs at the desired intervals. The cam track illustrated in FIG. 4 is provided with one such pair of projecting parts 50 so that the dogs 35 will be moved outwardly once during each half-revolution of the cam member. When the cam follower projections 37 are in the major portion of the cam track the dogs are projected inwardly and remain in position to hold the first piston 28 at its second conduit blocking position. However, when the projections 37 ride into the outwardly projecting portions 50 the dogs are withdrawn, so that the piston 28 then becomes free to move to its second conduit clearing position when pressure is again increased in the conduits 10 and 12, thereby permitting the flow of liquid through the second conduit. When the pressure is next reduced, the spring 32 returns the first piston to its blocking position and the dogs 35 are then projected into their holding position. In the cam illustrated there are twenty-four ratchet teeth 46 adapted to be engaged successively by means to be described for rotating the cam member in a step-by-step fashion, so that the opening and closing of the second conduit occurs after each twelve step movements of the cam member. By removing the snap ring 42 the bearing ring 41 and cam member 39 may be withdrawn (following removal of the cover disc 21) and a different cam member substituted therefor. Such different cam member may have two or more opposed pairs of high parts 50 so that the repetitious opening and closing of the second conduit may occur after each quarter or each one-sixth revolution of the cam member or other fraction thereon as desired.

The lower portion of the cup-shaped member 20 is provided with an opening 49 (FIG. 4) of suitable configuration to receive a transversely extending cylinder member 51, the wall of which is provided with an opening 52 (FIG. 2) whereby the interior of the lower portion of the housing member 20 and the interior of the intermediate portion of the cylinder member 51 are in open communication with each other. Fixed within the right end (FIG. 3) of the cylinder member 51 is a cylinder bushing 53 which partially receives a second piston 54 when said second piston is in its normal position, a position occupied when the pressure in the conduit system is decreased. The cylinder bushing is retained by a shouldered plug 55 and snap ring 56, the bushing clamping a gasket 57 against an internal shoulder in the cylinder member so that this end of the cylinder member is sealed. The inner end of the cylinder bushing 53 clamps the beaded edge of a rolling diaphragm 58 against a shoulder in the cylinder member 51. The rolling diaphragm extends around the head of the piston 54 and a screw 59 passing through the center of the diaphragm and the head of the piston retains the piston on the right end (FIG. 3) of a piston rod 60 which extends beneath and beyond the lower part of the cam member. The piston 54 is movable from its first or normal position, as illustrated in FIG. 3, to a second position toward the left, being limited by a flange member 61 fixed in the cylinder member. The screw 59 holds a spring retainer cup 62 against the head end of the diaphragm in which is seated one end of a balancing spring 63, the other end being seated in a groove seat in the plug 55. The movement of piston 54 from its first to its second position is accomplished when an increase in pressure occurs within the cylinder bushing 53, which increase is provided by a bypass conduit 65 leading from the upstream side of conduit 12, beyond the blocking position of piston 28, to the interior of the cylinder bushing. A leaf spring pawl 66 is fastened to the piston rod 60 below the closest point of the ratchet member 45, the pawl riding beneath the teeth of the ratchet member upon movements due to the increase of pressure, but successively engaging the teeth upon return movements due to a decrease in pressure so as to rotate the cam member in a step-by-step fashion with movements occurring when the pressure is decreased, rather than on the opposite stroke when the pressure might cause binding of parts. A spring dog 67 fastened to the housing at the top thereof engages the teeth to prevent reverse rotation of the ratchet member.

The piston rod 60 extends beyond the housing toward the left (FIG. 3) and through an opening in a limiting flange 70 similar to flange 61, the end of the piston rod 60 being integrally formed as a piston 71. The piston 71 is part of a dashpot device generally indicated at 72. The dashpot device includes a second rolling diaphragm 73, the closed end of which lies against the head of piston 71, and the open bead edge thereof being clamped between a shoulder in the cylinder member 51 and a bleed orifice member 74. The bleed orifice member 74 seats the bead edge of a third rolling diaphragm 75 which is clamped thereagainst by a bushing 76. The bushing is held against movement by a plug 77 seated in the end of the cylinder member and retained by a snap ring 78. A quantity of suitable fluid indicated at 80 is trapped between the diaphragms 73 and 75, the fluid moving successively from right to left and back again through an orifice 81 in the member 74, the size of which controls the rate of escape of the fluid and hence the rate of movement of the piston rod 60.

The rolling diaphragm 75 is engaged by a dashpot piston 82, the stem of which extends into a concentric bore in a threaded dashpot guide member 83 which threadedly engages a threaded opening in the plug 77. A return spring 84 surrounds the stem 86 and the inner end of the guide member 83. One end of the spring 84 is seated within the piston 82 and the other end is seated against a shoulder 87 on the guide member. Rotation of the guide member 83 by means of a screwdriver engaged in its slotted exposed end determines the degree of compression of the return spring 84, and the degree of compression may be held fixed by a lock nut 88. The interior of the guide stem is vented by an orifice 89 and the space within the bushing 76 is vented by an orifice 90 extending through the plug 77.

When the pressure in conduit 12 increases beyond a predetermined point as set by the adjustment of compression spring 84, the resistance of spring 84 is overcome and the piston rod 60 is moved to its second position, at a gradual rate determined by the escape of fluid from right to left through the orifice 81. Upon a decrease in pressure the fluid returns through the orifice 81 under the urging of spring 84, thereby causing return of the piston rod 60 to the position illustrated in FIG. 3 at a controlled rate determined by the rate of escape of the fluid through the orifice 81. Therefore, the effect of water hammer or sudden surges of pressure in the conduit system is damped and all movements of the cam member occur at a gradual, controlled rate. Also, the dashpot device prevents sudden return of the piston rod 60 upon a decrease in pressure so that the valve device itself is prevented from becoming a source of water hammer.

In FIG. 2 it will be seen that the first piston 28 is relatively loosely fitting on the downstream side of the piston ring 29 so that water in a sprinkling system may drain from the riser conduit 15, passing the piston, passing through the guide openings 36 and into the interior of the housing member 20 and the interior of the cylinder member 51 between the pistons 54 and 71, the piston rod 60 loosely fitting central openings in the flange members 61 and 70 so that they too may be lubricated by the water or other liquid being distributed.

In FIGS. 5 to 8 of the drawings there is shown a valve mechanism 100 which may be used interchangeably with the valve mechanism shown in FIGS. 1 to 4, and which constitutes another embodiment of the invention. The valve mechanism 100 includes a one-piece, molded plastic housing portion 102 which may be made by injection molding a suitable strong, dimensionally stable plastic material such as, for example, a known polymerized vinyl chloride compound. The housing or casing 102 includes a tubular member or portion 103 and a second tubular member or portion 105 lying alongside the portion 103 and extending parallel thereto. The casing 102 also includes an enlarged end casing member 106 adapted to be closed by a cap 104 snapping over a detent and sealing ring 107. The right hand end of the tubular portion 103 projects beyond the right hand end of the tubular portion 105 and has a pipe thread 108 thereon adapted to be threaded into an outlet nipple such as the outlet nipple 11 (FIG. 2), and also is provided with an annular internal groove 109 (FIG. 5) in which a screening member 111 is mounted. A valve closing piston 110 having O-rings 112 and 114 is urged to the right, as viewed in FIG. 5, by a compression spring 118 seated between the end of a bore 119 in the piston 110 and a spring seat member or plug 120 having a dashpot orifice 121 therein secured in the tubular portion 103 by a snap ring 122. The tubular portion 103 has a bore 123 of relatively large diameter into which a port 124 to a branch line communicates, tapped connection 125 being provided. Concentric with the bore 123 is a reduced bore 126 with a tapered or blending portion 127 connecting the bores 123 and 126, which are concentric relative to one another. The orifice 121 effects a dashpot action on the movements of the piston 110 and the provision of the stepped bores 123 and 126 permits a reduced portion 128 of the piston to effect the opening and closing of the port 124 from the inlet side or right-hand end of the tube 103 so that the O-ring 114 is never scraped by the laterally positioned opening 124 and is maintained in very effective sealing condition thereby. The conduit or tubular member 103 has at its inlet a bore 129 which communicates with the reduced bore 126.

A ratchet wheel 130 has a cam groove 131 positioned therein which is like the cam groove 38 in the ratchet wheel 45 and serves to control the position of dogs or stop members 132 in the same manner that the cam groove 38 controls the position of the dogs 35, the dogs 132 being shown in their retracted or non-blocking position in FIG. 5. The ratchet wheel 130 has a stepped bore 133 and is mounted rotatably on the left-hand end of the tubular member 103, as viewed in FIG. 5. A split ring 136 secured removably in a groove in the tubular member 103 maintains the ratchet wheel 130 against longitudinal movement while permitting rotation of the wheel 130 on the tubular member 103. The enlarged housing portion 106 has an air bleeder port 135 to permit air from the dashpot passage 121 to flow into the atmosphere.

The ratchet wheel 130 has a series of undercut teeth 140 adapted to be engaged by a pawl 142 having an undercut ratchet engaging portion 142a and the ratchet teeth are provided with an accelerating cam configuration so that during the initial portion of the operative stroke of the pawl 142 in which it moves toward the right, as viewed in FIG. 7, the pawl engages a gently sloped portion 140a of the tooth 140 to apply a high wedging force to the ratchet to break the ratchet loose or to start it rotating. Then after the initial resistance to starting of rotation of the ratchet wheel has occurred, the pawl 142 engages more sharply sloped portions 140b of the ratchet tooth to rapidly rotate the ratchet wheel. The pawl 142 and the ratchet wheel also preferably are formed from an injection molding operation utilizing a suitable known plastic material such as polymerized vinyl chloride compound or the like. The pawl 142 is formed integrally with piston member 150 with a resilient interconnecting web portion 142b, which is much wider than it is thick, to permit the pawl 142 to ride over each sloping ratchet tooth in its retracting stroke while applying a large force on the particular ratchet tooth engaged without deflecting appreciably in its operating or actuating stroke. A screw 152 engages a keyway 142c in the pawl 142. A compression spring 154 seated against the inner end of bore 143 and in an annular spring seat 151 in the piston 150 urges the piston 150 toward the right as viewed in FIG. 7, the piston 150 being slidable in bushing 156 mounted in the bore 143. A bleed orifice member 160 similar to the member 74 (FIG. 3) is sealingly pressed into engagement with O-ring portions of rolling diaphragms 162 and 164 through a bushing 166 pressed by a plug 168 threaded into bore 169 sufficiently to seal the two O-ring portions of the rolling diaphragms. An O-ring 170 seals the plug 168 against leakage from the interior of the passage 143.

A piston 172 mounted slidably in the bushing 166 is urged to the right by compression spring 174 seated in a cup-shaped end of the piston 172 and on a boss portion 175 of the plug 168. The piston 172 engages at its left-hand end as viewed in FIG. 7 the rolling diaphragm 164 and between the rolling diaphragms 162 and 164 there is positioned a predetermined quantity of a metering fluid designed to pass through the bleed orifice 185. The fluid 176 is a known liquid silicone which maintains its viscosity very uniformly throughout a wide range of temperatures, which range is sufficiently large to include both the extremes of hot and cold to which the valve 100 will be subjected during operation. A bleeder port 177 is provided in the right-hand end of the tubular member 103 to supply water to the right-hand end of the piston 172 at the pressure in the main supply line supplied through the nipple thread portion 108 of the valve, and the bushing 166 has a slot 178 therein which is aligned with the port 177 by suitable keying means (not shown) between the bushing 166 and the tubular member 105.

As shown in FIGS. 5 and 6, a pin 182 keys the cap 104 to the member 103 against rotation therebetween and the cap 104 carries a spring pawl 184 designed to permit teeth 137 to be moved in a clockwise direction therepast as viewed in FIG. 6, which is the normal actuated direction of the ratchet wheel 130, but prevent rotation of the ratchet wheel 130 in a counterclockwise direction.

Each time the pressure in the main line is raised to an operating level, the piston 172 is moved to the left from the position thereof shown in FIG. 7 at a rate of speed determined by the bleed orifice 185 and the piston 150 is moved to the left at the same rate of speed, to move the pawl 142 in its retraction or cocking stroke in which the pawl 142 rides up over one of the teeth 140 and to a cocked position for rotating the ratchet wheel with energy stored in the spring 154. The pressure in the main water line also exerts pressure on the right-hand end of piston 110, as viewed in FIG. 5, the dogs or stops 132 being in their normal positions projecting into the path of the piston 110, and the dogs prevent its movement in a valve-opening direction to the left. Then upon the next shut-down of pressure in the main line to decrease the water pressure, the spring 154 urges the piston 150 to the right with its stored energy at a rate determined by the bleed orifice 185, and the pawl 142 turns the ratchet wheel 130 through an arc equal to the pitch of each tooth 137. It should be noted that the water pressure is relieved on the right-hand end of the piston 110, as viewed in FIG. 5, before there is any appreciable movement of the pawl 142 in its operating stroke, so that any binding force of the piston 110 on the dogs 132 is relieved before the ratchet wheel 130 is started to be moved. Also, at the very start of the movement of the piston 150 there is a very high multiplication of force from the pawl 142 to the ratchet wheel, and after the ratchet wheel has started to move the force multiplying factor greatly decreases so that the wheel is rotated quite rapidly throughout substantially all of the remainder of the stroke. After a predetermined number of these alternate increases and decreases of pressure of sustained duration, the ratchet wheel moves the dogs 132 out of the path of the piston to permit the piston 110 to move to its open position when the water pressure is again raised. On the next succeeding movement of the ratchet wheel, the dogs are moved back to their blocking positions.

A valve mechanism 200 (FIGS. 9 and 10) forming a further embodiment of the invention is substantially identical with the valve mechanism 100 of FIGS. 5 to 8 except that the drive of an indexing pawl 242 is an integral unit or cartridge 213 which may be inserted into or removed from a casing or housing 202 which corresponds to the housing 102 except for the mounting of the cartridge 213. A set screw 203 locks the cartridge in precisely oriented position in bore 243. The cartridge 213 comprises a sleeve 204 having a keyway 205 slidable onto key portion 215 to precisely orient the sleeve 204. The casing 202 has a threaded portion 208 adjacent the inlet end of the valve mechanism which is connected to the main conduit of the irrigation system to supply water from the main conduit at the pressure of the water in the main conduit to a branch conduit, and has a port 277 continuously open to the main conduit. The sleeve 204 has a port 217 aligned with the port 277 to admit the water under the main conduit pressure into the interior of a bushing 266 having an aligned port portion 278. The cartridge 213 contains elements 242, 250, 252, 254, 260, 262, 264, 266, 268, 270, 272 and 274, corresponding to their respective elements 142, 150, 152, 154, 160, 162, 164, 166, 168, 170, 172 and 174, and the valve 200 operates in the same way as the above-described operation of the valve 100 and includes piston 210 and compression spring 218 corresponding to the piston 110 and compression spring 218 of the valve 100.

In a valve mechanism 300 (FIGS. 11 and 12) forming a further embodiment of the invention, there is provided a valve casing or housing 302 and is identical with the valve 100 except as brought out hereinbelow. In the valve 300 movable dogs or stop members corresponding to the dog or stops 132 are omitted, and stop members 332 are rigidly and immovably fixed on piston 310 slidably mounted in bore 323 in conduit portion 303 of the housing 302. The stop members 332 are slidable along parallel, oppositely disposed, longitudinally extending keyways 305 extending through the portion of the conduit portion 303 rotatably mounting the ratchet wheel 330. The ratchet wheel 330 is driven by actuating or indexing pawl means 342 and drive similar to those described above and shown in FIGS. 5 to 10. The ratchet wheel 330 is provided with pairs of keyways or clearance openings 333, 334 and 335. When ever one of the pairs of keyways 333, 334 and 335 is aligned with the key portions 332 the piston 310 may be moved to the left as viewed in FIG. 11 to open the valve, while whenever one of these pairs of keyways is not aligned with the keys 332 the piston 310 is held in the closed position shown in FIG. 11, and thus effective stop means are provided for the piston 310. It will be noted that in the valve mechanism 300 with the ratchet wheel 330, the valve will be opened and closed three different times during one complete revolution of the ratchet wheel 330. However, the ratchet wheel 330 obviously may be replaced by a ratchet wheel like the wheel 330 but with only one pair of the keyways therein or with any other number of pairs compatible with the number of ratchet teeth 337 on the periphery thereof. The pawl 342 serves to rotate the ratchet wheel and an anti-return stop pawl 384 on a cap (not shown) corresponding to the cap 104 also is provided to prevent slipping back of the ratchet wheel 330.

Having illustrated and described preferred embodiments of the invention, it should be apparent to those skilled in the art that the invention permits of modification in arrangement and detail. I claim as my invention all such modifications as come within the true spirit and scope of the following claims.

I claim:
1. A liquid distribution system comprising
   a first conduit for conducting a liquid from an interruptible source of liquid under pressure,
   a second conduit connected to said first conduit,
   a first piston in said first conduit movable upon an increase of pressure in said first conduit from a second conduit blocking position to a second conduit clearing position whereby said piston acts as a valve to control the flow through said second conduit,
   first spring means opposing such movement of said first piston for returning said first piston to its blocking position upon a reducing of pressure in said first conduit,
   dogging means normally in position to hold said first piston at its blocking position and movable to a position permitting movement of said first piston to said second conduit clearing position,
   a rotatable cam member operatively associated with said dogging means for moving said dogging means from and back to its holding position in a repetitious cycle,
   a ratchet concentrically fixed to said cam for rotating said cam through said repetitious cycle in a predetermined number of steps,
   a cylinder mounted adjacent said ratchet,
   a bypass conduit connecting said cylinder to said first conduit on the upstream side of said first piston,
   a second piston in said cylinder movable from a first position to a second position upon an increase of pressure in said first conduit,
   second spring means for returning said second piston to its first position upon a decrease of pressure in said first conduit, and a pawl connected to said second piston and successively engaging the teeth of said ratchet to rotate said cam member in a step-by-step manner, the stroke of said second piston being so related to the construction of said cam member, pawl and ratchet that said dogging means is moved from its blocking position of said first piston only upon a predetermined number of strokes of said second piston, whereby said second conduit is opened to liquid flow therethrough only upon repetitions of a predetermined number of cycles of increasing and decreasing pressure in said first conduit.

2. The structure set forth in claim 1 wherein said pawl operatively engages the teeth of said ratchet upon the return movement of said second piston to its first position whereby said dogging means is moved at times when said first piston is subjected to decreased pressure.

3. A liquid distribution system comprising
a first conduit for conducting a liquid from an interruptible source of liquid under pressure,
a second conduit connected to said first conduit,
a first piston in said first conduit movable upon an increase of pressure in said first conduit from a second conduit blocking position to a second conduit clearing position whereby said piston acts as a valve to control the flow of liquid through said second conduit,
first spring means opposing such movement of said first piston for returning said first piston to its blocking position upon a reduction of pressure in said first conduit,
dogging means normally in position to hold said first piston at its blocking position,
a rotatable cam member operatively associated with said dogging means for moving said dogging means from and back to its holding position in a repetitious cycle,
a ratchet concentrically fixed to said cam,
a cylinder mounted adjacent said ratchet,
a bypass conduit connecting said cylinder to said first conduit on the upstream side of said first piston,
a second piston in said cylinder movable from a first position to a second position upon an increase of pressure in said first conduit,
second spring means for returning said second piston to its first position upon a decrease of pressure in said first conduit,
a pawl so reciprocated by said second piston as to successively engage the teeth of said ratchet and rotate said cam member in a step-by-step manner, the stroke of said second piston being so related to the construction of said cam member, pawl and ratchet that said dogging means is moved from its blocking position of said first piston only upon a predetermined number of strokes of said second piston, whereby said second conduit is opened to liquid flow therethrough only upon repetitions of a predetermined number of cycles of increasing and decreasing pressure in said first conduit,
and a dashpot device associated with said second piston for damping the movements thereof.

4. A liquid distribution system comprising
a first conduit for conducting a liquid from an interruptible source of liquid under pressure,
a second conduit connected to said first conduit,
a first piston in said first conduit movable upon an increase of pressure in said first conduit from a second conduit blocking position to a second conduit clearing position whereby said first piston acts as a valve to control the flow of liquid through said second conduit,
first spring means opposing such movement of said first piston for returning said first piston to its blocking position upon a reduction of pressure in said first conduit,
said first conduit having an opening in its wall,
a dog movable through said opening into engagement with said first piston for normally holding said first piston at its blocking position,
a cam rotatably and concentrically mounted upon said first conduit and operatively connected to said dog for moving said dog out of its holding position and returning it in a repeating cycle,
a ratchet concentrically fixed to said cam,
a housing mounted upon said first conduit and enclosing said cam and ratchet,
a cylinder mounted on said housing and extending therefrom at right angles to said first conduit,
a bypass conduit connecting said cylinder to said first conduit at the upstream side of said first piston,
a second piston in said cylinder movable from a first position to a second position upon an increase of pressure in said first conduit,
said second piston extending into said housing in proximity to said ratchet,
second spring means for returning said second piston to its first position upon a decrease of pressure in said first conduit,
and a pawl mounted upon said second piston and so movable by said second piston as to successively engage the teeth of said ratchet and rotate said cam in a step-by-step manner, the stroke of said second piston being so related to the construction of said cam, pawl and ratchet that said dog is moved from its blocking position of said first piston only upon a predetermined number of strokes of said second piston, whereby said second conduit is opened to liquid flow therethrough only upon repetitions of a predetermined number of cycles of increasing and decreasing pressure in said first conduit.

5. The construction of claim 4 wherein said pawl comprises a leaf spring which underrides the teeth of said ratchet upon movement of said second piston from its first position to its second position.

6. A liquid distribution system comprising
a first conduit for conducting a liquid from an interruptible source of liquid under pressure,
a second conduit connected to said first conduit,
a first piston in said first conduit movable upon an increase of pressure in said first conduit from a second conduit blocking position to a second conduit clearing position whereby said first piston acts as a valve to control the flow of liquid through said second conduit,
a first spring means opposing such movement of said first piston for returning said first piston to its blocking position upon a reduction of pressure in said first conduit,
said first conduit having an opening in its wall,
a dog movable through said opening into engagement with said first piston for normally holding said first piston at its blocking position,
a cam rotatably and concentrically mounted upon said first conduit and operatively connected to said dog for moving said dog out of its holding position and returning it in a repeating cycle,
a ratchet concentrically fixed to said cam for rotating the cam through one revolution in a predetermined number of steps,
a housing mounted upon said first conduit and enclosing said cam and ratchet,
a cylinder mounted on said housing,
a bypass conduit connecting said cylinder to said first conduit at the upstream side of said first piston,
a second piston in said cylinder movable from a first position to a second position upon an increase of pressure in said first conduit,
said piston extending into said housing in proximity to said ratchet,
second spring means for returning said second piston to its first position upon a decrease of pressure in said first conduit, a pawl mounted upon said piston and so reciprocated by said piston as to successively engage the teeth of said ratchet and rotate said cam in a step-by-step manner, the stroke of said second piston being so related to the construction of said cam, pawl and ratchet that said dog is moved from its blocking position of said first piston only upon a predetermined number of strokes of said second piston, whereby said second conduit is opened to liquid flow therethrough only upon repetitions of a predetermined number of cycles of increasing and decreasing pressure in said first conduit, and a closed dashpot device operatively associated with said second piston whereby movements of said second piston in either direction are accomplished at a controlled, damped rate.

7. A liquid distribution system comprising a first conduit for conducting a liquid from an interruptible source of liquid under pressure, a second conduit connected to said first conduit, a first piston in said first conduit movable upon an increase of pressure in said first conduit from a second conduit blocking position to a second conduit clearing position whereby said first piston acts as a valve to control the flow of liquid through said second conduit, first spring means opposing such movement of said first piston for returning said first piston to its blocking position upon a reduction of pressure in said first conduit, said first conduit having an opening in its wall on the downstream side of said first piston, a dog movable through said opening into engagement with said first piston for normally holding said first piston at its blocking position, a cam rotatably and concentrically mounted upon said first conduit and operatively connected to said dog for moving said dog out of its holding position and returning it in a repeating cycle, a ratchet concentrically fixed to said cam for rotating said cam one revolution in a predetermined number of steps, a housing mounted upon said first conduit and enclosing said cam and ratchet, a cylinder mounted on said housing, a bypass conduit connecting said cylinder to said first conduit at the upstream side of said first piston, a second piston in said cylinder movable from a first position to a second position upon an increase of pressure in said first conduit, said piston extending into said housing in proximity to said ratchet, second spring means for returning said second piston to its first position upon a decrease of pressure in said first conduit, and a pawl mounted upon said piston for successively engaging the teeth of said ratchet to rotate said cam in a step-by-step manner, the stroke of said second piston being so related to the construction of said cam, pawl and ratchet that said dog is moved from its blocking position of said first piston only upon a predetermined number of strokes of said second piston, whereby said second conduit is opened to liquid flow therethrough only upon repetitions of a predetermined number of cycles of increasing and decreasing pressure in said first conduit, said first piston permitting draining of liquid from said second conduit when in its blocking position whereby liquid may flow through said opening into said housing to lubricate said cam and dog.

8. In an irrigation valve adapted to be actuated by a drop in pressure of water supplied thereto, a valve casing member having an inlet and an outlet, a valve member biased toward a closed position closing the outlet from the inlet and urged by water pressure at the inlet toward an open position in which the water may flow from the inlet to the outlet, blocking means having a blocking position in which the valve member is urged against the blocking means, the blocking means also being movable from the blocking position thereof to a second position permitting movement of the valve member to the open position thereof, and means responsive to a drop in water pressure at the inlet to move the blocking means from its blocking position to its second position so that force on the blocking means from the valve member is relieved as the blocking means is so moved.

9. In an irrigation valve, a casing member having a cylindrical passage and an inlet and an outlet spaced along the passage, piston means urged along the passage toward a closed position blocking the outlet from the inlet and movable by water pressure at the inlet toward an open position permitting flow of water from the inlet to the outlet, blocking means movable generally transversely of the passage from a blocking position in the path of and engaged by the piston means to a second position out of the path of the piston means, and means responsive to a drop of a predetermined magnitude and a predetermined duration in water pressure at the inlet for moving the blocking means from its blocking position to its second position while the water pressure on the piston means is reduced.

10. The irrigation valve of claim 9 wherein the outlet of the casing member is positioned laterally relative to the passage, the portion of the passage including the outlet being of a predetermined diameter and the passage having a second portion between the inlet and the outlet having a diameter substantially smaller than said predetermined diameter, the passage also having a tapered portion joining the first-mentioned portion and the second portion, the piston means including a stepped piston having an end portion fitting closely in the second portion of the passage and a second portion fitting closely in the first-mentioned portion of the passage, and an O-ring seal mounted on the end portion of the piston.

11. In an irrigation valve, a valve casing having an inlet and an outlet, a valve member movable in the casing between an opening position and a closing position, actuating means responsive to a change of a predetermined magnitude in water pressure at the inlet for moving the valve member from a closed position to an open position, blocking means normally operable to prevent movement of the valve member to the opening position thereof, cam means operable when in a predetermined position relative to the blocking means for rendering the blocking means inoperative, ratchet means operable independently from the actuating means and responsive to changes in water pressure at the inlet for moving the cam means to said predetermined position after a predetermined number of changes in water pressure at the inlet, and timing means preventing operation of the actuating means by changes in water pressure at the inlet of less than a predetermined duration.

12. In an irrigation valve, a valve casing member having an inlet and an outlet, a valve member normally in a closed position closing the outlet from the inlet and urged by water pressure at the inlet toward an open position in which the water may flow from the inlet to the outlet, blocking means having a blocking position in which the valve means is urged against the blocking means, the blocking means also being movable from the blocking position thereof to a second position permitting movement of the valve member to the open position thereof, reciprocal piston means in communication with the inlet at one end thereof, spring means urging the piston means against force on the piston means from the pressure of the water from the inlet, cam means for moving the blocking means from the blocking position thereof to the second position thereof when in a predetermined position relative to the blocking means, ratchet means for stepping the cam means in a predetermined number of steps to the predetermined position of the cam means, and pawl means operable by the piston means for stepping the ratchet means.

13. In an irrigation valve, a casing member having a first cylindrical passage and an inlet and an outlet spaced along the passage and also provided with a second cylindrical passage extending along the first cylindrical passage, a valve piston urged along the first passage toward a closed position blocking the outlet from the inlet and movable by water pressure at the inlet toward an open position permitting flow of water from the inlet to the outlet, a control piston reciprocably mounted in the second passage, the casing having a supply port between the inlet and one means for supplying water from the inlet to one end of the control piston, blocking means movable generally transversely of the passage from a blocking position in the path of and engaged by the valve piston to a second position out of the path of the valve piston, and actuating means operable by the control piston upon the occurrence of a predetermined number of actuations of the control piston for moving the blocking means between the blocking and second positions thereof.

14. The irrigation valve of claim 13 wherein the blocking means and the actuating means include a ratchet wheel rotatably mounted on the casing in alignment with the longitudinal axis of the passage, cam means operable by a predetermined number of steps of the ratchet wheel for causing movement of the blocking means to the second position thereof, and a pawl carried by the control piston for stepping the ratchet wheel.

15. The irrigation valve of claim 14 wherein the ratchet wheel has acceleration cam teeth.

16. The irrigation valve of claim 13 including a cartridge insertable into and removable from the second cylindrical passage as a unit and comprising a sleeve member mounting the control piston slidably therein and having a port alignable with the supply port in the casing and spring means urging the control piston along the sleeve toward the ports.

17. In an irrigation valve, a valve casing member having an inlet portion and an outlet portion, a valve member in the casing member urged normally to a closed position closing off the outlet portion from the inlet portion and movable to an open position permitting flow from the inlet to the outlet portion by pressure of water greater than a predetermined pressure, stop means movable between an operative position blocking movement of the valve member to its open position and a second position permitting movement of the valve member to its open position, pressure responsive means operable by a predetermined number of drops in pressure of water in the inlet portion to said predetermined pressure for moving the stop means to the second position thereof, and means for returning the stop means to the operative position thereof.

18. In an irrigation valve, a valve casing having a cylindrical passage provided with an inlet portion and an outlet portion spaced along the passage from the inlet portion, a piston slidable along the passage, means normally urging the piston to a closing position closing the outlet portion from the inlet portion and permitting movement of the piston by pressure of water in the inlet portion of the passage greater than a predetermined pressure to an opening position to permit flow of water from the outlet portion to the inlet portion, stop means movable laterally with respect to the piston between a blocking position in the path of movement of the piston to prevent movement of the piston from its closing position to its opening position and a retracted position out of the path of movement of the piston, cam means for moving the stop means between the operative position thereof and the retracted position thereof, and ratchet means driven by a predetermined number of changes in pressure of water in the inlet portion for driving the cam means to a position moving the stop means to the retracted position thereof after the ratchet means has been driven by said predetermined number of changes in the pressure of the water in the inlet position.

19. In an irrigation valve, a cylindrical conduit having an inlet at one end thereof and an outlet intermediate the ends thereof, a piston slidable in the conduit from a closed position covering the outlet to an open position in which water is free to flow from the inlet to the outlet, spring means in the other end of the conduit remote from said one end for urging the piston toward the closed position and permitting movement of the piston by pressure of water in the conduit above a predetermined pressure to the open position thereof, dog means slidable into the conduit to block movement of the piston from the closed position thereof and also slidable out of the conduit to permit movement of the piston from the closed position thereof, rotatable cam means on the conduit for driving the dog means, and counting means responsive to changes in water pressure in the conduit for stepping the cam means to drive the dog means out of the conduit after a predetermined number of changes in water pressure in the conduit.

20. In an irrigation valve, a casing having a cylindrical passage and an external bearing at one end of the passage, the casing also having an inlet at the other end of the passage and an outlet positioned between the ends of the passage, ratchet wheel means mounted rotatably on the bearing, piston means slidable in the passage for closing the outlet, and means responsive to changes of water pressure in the casing for stepping the ratchet wheel means, the ratchet wheel means and the piston means being provided with portions blocking movement of the piston means except when the ratchet wheel means is stepped a predetermined number of times.

21. In an irrigation valve, a valve casing having an inlet and an outlet, a valve member normally biased to a closing position and movable to an opening position by pressure of water at the inlet above a predetermined pressure, piston means movable independently of the valve member in response to a change of a predetermined magnitude in water pressure at the inlet, ratchet means steppable by the piston means, locking means normally operable to hold the valve member in the closing position thereof, and cam means operable by the ratchet means upon the occurrence of a predetermined number of operations of the piston means for moving the locking means to a position releasing the valve member for movement from the closing position thereof to the opening position thereof.

22. The irrigation valve of claim 21 including a cartridge insertable into and removable from the valve casing as a unit and comprising a sleeve mounting the piston means and the damping means therein, and means for locking the sleeve in the casing.

23. In an irrigation valve, a casing having a cylindrical passage and an external bearing at one end of the passage, the casing having an inlet at the other end of the passage and an outlet positioned between the ends of the passage, ratchet wheel means mounted rotatably on the bearing, piston means slidable in the passage for closing the outlet, means responsive to changes in water pressure in the casing for stepping the ratchet wheel means, and means keying the piston means against rotation in the casing, the ratchet wheel means having a central hole eccentric to the longitudinal axis of the piston means and the end portion of the piston means adjacent the ratchet wheel means being complementary in shape to the central hole so that the ratchet wheel means blocks longitudinal movement of the piston means except when the ratchet wheel means is stepped a predetermined number of times to align said end portion of the piston means with the central hole.

24. In an irrigation valve, a casing having a cylindrical passage and an external bearing at one end of the passage, the casing having an inlet at the other end of the passage and an outlet positioned between the ends of the passage, ratchet wheel means mounted rotatably on the bearing, piston means slidable in the passage for closing the outlet, means responsive to changes in water pressure in the casing for stepping the ratchet wheel means, the casing having a keyway extending therealong at said one end of the passage, and a key fixed to the piston and slidable along the keyway, the ratchet wheel means having a clearance slot adapted to permit movement of the key therethrough only when the ratchet wheel means is stepped a predetermined number of times.

References Cited in the file of this patent

UNITED STATES PATENTS

| | | |
|---|---|---|
| 1,645,763 | Lundberg | Oct. 18, 1927 |
| 2,307,784 | Mapes | Jan. 12, 1943 |
| 2,372,324 | Hauser | Mar. 27, 1945 |
| 2,625,174 | Forde | Jan. 13, 1953 |
| 2,678,845 | Fitter | May 18, 1954 |
| 2,690,322 | Stansfield | Sept. 28, 1954 |
| 2,693,338 | Grunt | Nov. 2, 1954 |
| 2,713,989 | Bryant | July 26, 1955 |
| 2,793,908 | Carver | May 28, 1957 |
| 2,894,580 | Becker | July 14, 1959 |
| 2,947,323 | Becker | Aug. 2, 1960 |
| 3,040,772 | Todd | June 26, 1962 |
| 3,066,688 | Young | Dec. 4, 1962 |